United States Patent [19]

Tsao

[11] 4,342,735
[45] Aug. 3, 1982

[54] STRIPPING OF AQUEOUS AMMONIUM CARBONATE SOLUTION

[75] Inventor: Utah Tsao, Jersey City, N.J.

[73] Assignee: The Lummus Company, Bloomfield, N.J.

[21] Appl. No.: 256,945

[22] Filed: Apr. 23, 1981

[51] Int. Cl.³ .............................................. C01C 1/10
[52] U.S. Cl. .................................... 423/356; 423/358; 423/420; 423/438; 203/96; 260/465 C; 260/465 H
[58] Field of Search ....................... 423/352, 356–358, 423/420, 438; 203/96; 260/465 C, 465 H

[56] References Cited

U.S. PATENT DOCUMENTS

| | | | |
|---|---|---|---|
| 1,595,602 | 8/1926 | Heffner et al. | 423/352 |
| 1,962,150 | 6/1934 | Mohler et al. | 423/352 |
| 3,594,987 | 7/1971 | Oda et al. | 260/465 C |
| 4,148,865 | 4/1979 | Gelbein et al. | 423/358 |
| 4,246,417 | 1/1981 | Tsao | 260/465 C |

Primary Examiner—Earl C. Thomas
Attorney, Agent, or Firm—Elliot M. Olstein; Louis E. Marn

[57] ABSTRACT

In stripping ammonia and carbon dioxide from an aqueous ammonium carbonate solution including organic ammonium salts, inorganic base is introduced into the column at a point below the point of the feed introduction and above the column bottom to liberate ammonia from the ammonium salts and thereby produce a bottoms of reduced ammonium content.

10 Claims, 1 Drawing Figure

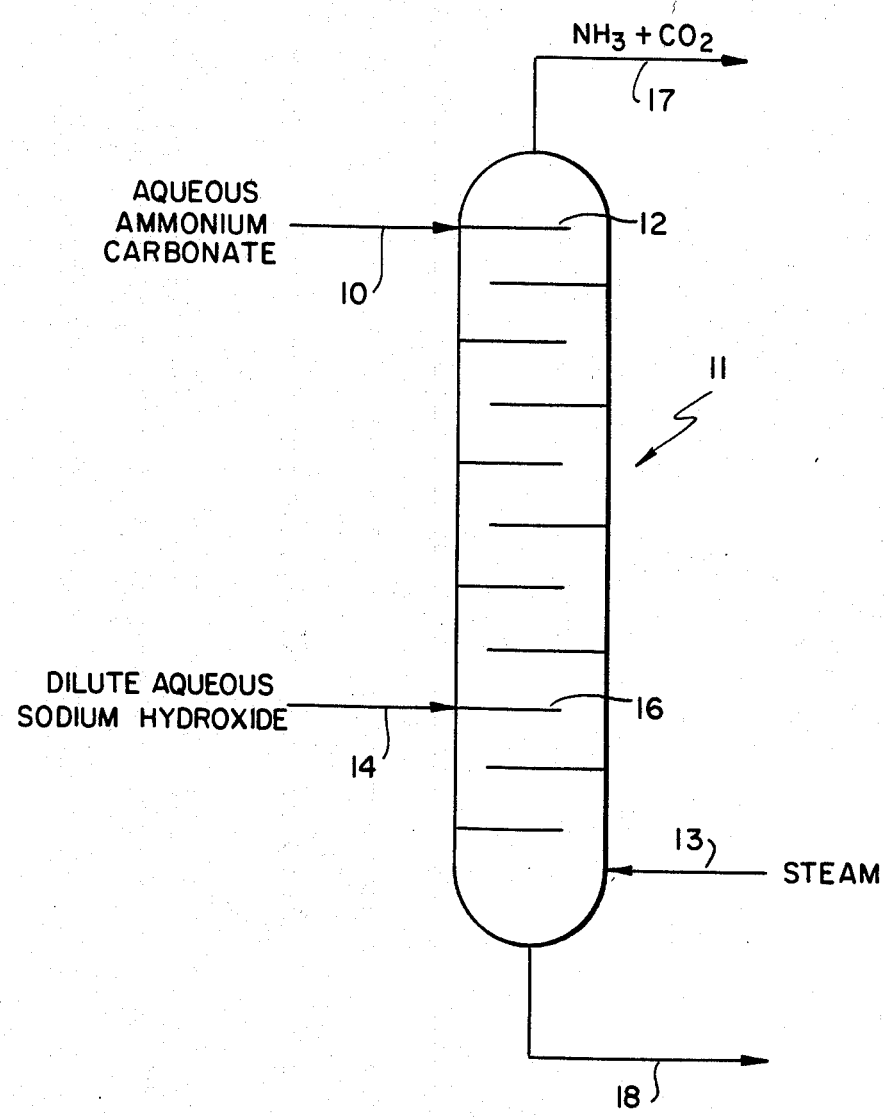

STRIPPING OF AQUEOUS AMMONIUM CARBONATE SOLUTION

This invention relates to recovery of ammonia, and more particularly to recovery of ammonia from an aqueous solution of ammonium carbonate.

In a process for producing aromatic nitriles, there is recovered from the cooled reaction product an organic layer of organic products and unconverted feed material, and an aqueous layer of ammonium carbonate solution. The solution is then stripped to remove ammonia, carbon dioxide and trace amounts of dissolved organics, with the overhead being further processed to recover ammonia and reject carbon dioxide. In such a stripping operation, ammonium carbonate is dissociated into ammonia and carbon dioxide which are both stripped from the solution. In a well designed stripper, it should be possible to reduce the ammonium content of the bottoms solution to less than 100 ppm; however, it has been found that in operating such a stripping column the ammonium content of the stripped bottoms stream is erratic and ranges from several hundred to several thousand ppm.

The present invention is directed to improving such a stripping operation so as to reduce the ammonium content of the stripped bottoms stream.

In accordance with the present invention, there is provided an improvement in a process for stripping ammonia and carbon dioxide from an aqueous ammonium carbonate solution wherein inorganic base is introduced into the stripping column at a point below the point at which the aqueous ammonium carbonate feed is introduced into the column.

Applicant has found that the difficulty in reducing the ammonium content of the stripped solution to a low concentration is due to the presence of organic ammonium salts, and by introducing inorganic base into the column at a point below the point of feed introduction and above the bottom tray of the column, it is possible to liberate ammonia from such ammonium salts, and then strip such liberated ammonia on the remaining trays in the bottom of the stripping column. Thus, in accordance with the invention, the ammonium content of the stripped solution is reduced to consistent values by liberating ammonia from the organic ammonium salts, with the dissociated ammonia being stripped from the solution in the column in the remaining bottom trays. In addition, it is believed that the inorganic base further functions to form a corresponding organic salt which can be removed in the column bottoms.

More particularly, the inorganic base is introduced into the column below the point of feed introduction, and above the bottom tray of the column so as to provide remaining trays for stripping of the dissociated ammonia. In accordance with the preferred embodiment, the aqueous inorganic base is introduced into the stripping column in the bottom portion thereof at a point which is above the bottom tray (generally at least 3 trays above the bottom of the column), and which is below the tray at which the temperature increase from tray to tray slows to about a constant value. Thus, in the stripping operation, the temperature in the stripping column below the feed point increases rapidly from tray to tray as ammonia and carbon dioxide are stripped from the solution, with the temperature then slowing to an approximately constant value when the ammonia content is reduced to a lower value; e.g., the ammonia content of the solution drops to below about 0.5%. In accordance with the preferred embodiment, the inorganic base is introduced into the column below this point, and at a point where there are some remaining trays for stripping the liberated ammonia. It is to be understood that the base could be added to the column at a higher tray; however, such addition would require greater amounts of base in order to insure that there was sufficient base to dissociate essentially all of the organic ammonium salts. Thus, the base added should be at least stoichiometrically sufficient to dissociate all of the ammonium compounds present in the solution at the point of base introduction to thereby insure dissociation of the organic ammonium salts, and as a result, the higher the point of introduction of the base into the column, the greater the quantity of required base. Accordingly, in accordance with the preferred embodiment, the base is introduced into the column at a tray where the ammonia content of the solution has been reduced to a low value by stripping; i.e., below about 0.5%, in order to minimize the base requirements for the operation.

The inorganic base which is introduced into the stripper may be any one of a wide variety of inorganic bases which are capable of dissociating organic ammonium salts, including, but not limited to alkali and alkaline earth metal hydroxides, with sodium hydroxide being preferred as a result of its low cost. In addition, the base should have a strength sufficient to form a corresponding organic salt which will not be stripped from the solution in the column in order to enable recovery thereof in the column bottoms.

The amount of base added to the column will vary with the ammonia content of the solution in the column at the point of introduction of the base. As hereinabove indicated, the amount of base should be at least stoichiometrically sufficient (generally a stoichiometric excess is used) to dissociate all of the ammonium compounds (ammonium carbonate as well as other ammonium compounds) in order to insure that there is sufficient base present to dissociate the organic ammonium salts. In accordance with the preferred embodiment wherein base is added to the column at a point where the ammonia content of the solution is below 0.5%, the base may be added in an amount of from 0.2 to 3.0%, preferably from 0.5 to 1.0%, by weight, of the downflow stream in the column. The base is preferably added as an aqueous solution, with the concentration generally being in the order of from 10% to 50%. The selection of an optimum amount of base for a given operation is deemed to be within the scope of those skilled in the art from the teachings herein.

The stripping column is generally operated at an overhead temperature of from 70° to 100° C., preferably from 80° to 90° C., a bottoms temperature of from 100° to 130° C., preferably of from 110° to 120° C., and at a pressure in the order of from 2 to 20 psig, and preferably from 5 to 15 psig. It is to be understood that such conditions are illustrative and other conditions may be employed, however, such conditions are generally less economical. The heat requirements for the stripping operation may be provided by introduction of live steam or by the use of a suitable reboil.

The invention will be further described with respect to the following drawing, wherein:

The drawing is a simplified schematic diagram of an embodiment of the invention.

It is to be understood, however, that the scope of the invention is not to be limited to the described embodiment.

Referring now to the drawing, aqueous ammonium carbonate, in line 10, is introduced into a stripping column schematically generally indicated as 11, with the feed tray for the column being designated as 12. As shown, the feed is introduced onto the top tray in order to flash non-soluble organics therefrom. It is to be understood that the embodiment is not limited to such introduction onto the top tray. The aqueous ammonium carbonate solution also includes soluble organic ammonium salts and in particular salts of one or more aromatic acids, such as benzoic, toluic, phthalic, phthalamic acid and the like. In accordance with the embodiment, such aqueous ammonium carbonate solution is derived from a reaction for producing an aromatic nitrile by ammonolysis or ammoxidation of an aromatic hydrocarbon. Thus, for example, in the production of isophthalonitrile from m-xylene, the reaction effluent from the isophthalonitrile production zone includes isophthalonitrile, unreacted m-xylene, ammonia, carbon dioxide, water vapor, as well as aromatic nitriles, aromatic acids and amides as byproducts. The reaction effluent is then subjected to a quenching and cooling operation to recover various liquid products. Thus, for example, the effluent may be initially quenched to condense isophthalonitrile, as well as some of the byproducts therefrom, followed by further quenching to condense additional organics and an aqueous ammonium carbonate solution. The organics, and aqueous ammonium carbonate solution are phase separated, and such separated aqueous ammonium carbonate solution will contain a minor amount of ammonium salts of the aromatic acids; for example, in the order of from 0.01 to 0.10%. Such aqueous ammonium carbonate solution is employed as the feed in line 10.

The stripping column 11 is provided with live steam through line 13 to provide heat and stripping requirements therefor. The column 11 is operated at temperatures and pressures as hereinabove described to dissociate the ammonium carbonate into ammonia and carbon dioxide, and to also strip such ammonia and carbon dioxide from the solution.

In accordance with the present invention, dilute aqueous sodium hydroxide is introduced into the column 11 through line 14, with the tray at which the aqueous sodium hydroxide is introduced being designated as 16. As hereinabove described, in accordance with the preferred embodiment, tray 16 is a tray at which the ammonia content of the downflowing solution is less than 0.5%, and at which there are additional bottom trays remaining for stripping of ammonia dissociated from the ammonium salts of the aromatic acids by the aqueous sodium hydroxide.

Ammonia and carbon dioxide are recovered as gaseous overhead from column 11 through line 17, with such overhead then being further treated to reject carbon dioxide, and recover ammonia for recycle to the nitrile production.

The stripped aqueous solution of reduced ammonium content is recovered from column 11 through line 18. The ammonium content of such solution in line 18 will vary with the particular solution introduced through line 10, and the design of the column; however, such stripped solution in line 18, as a result of the addition of alkali, will have an ammonium content lower than that which could be achieved without the addition of such aqueous sodium hydroxide.

In general, the aqueous solution in line 18 will consistently contain less than 100 ppm, and preferably less than 20 ppm of ammonium.

The invention will be further described with respect to the following example; however, the scope of the invention is not to be limited thereby:

EXAMPLE

The ammonium carbonate solution feed to the solution stripper from an isophthalonitrile plant has has the following composition:

|  | Wt. % |
|---|---|
| $NH_3$ | 19.00 |
| $CO_2$ | 7.00 |
| $H_2O$ | 73.89 |
| $NH_4CN$ | 0.01 |
| Organic Compounds | 0.10 |
|  | 100.00 |

The distribution of the organic compounds is approximately as follows:

| | |
|---|---|
| meta-xylene | 20 PPM |
| meta-Toluonitrile | 20 |
| isophthalonitrile | 20 |
| cyanobenzamide | 150 |
| Isophthalamide | 200 |
| meta-Toluamide | 20 |
| ammonium isophthalate | 300 |
| ammonium isophthalamate | 300 |
| | 1,030 PPM |

The solution which has been preheated is fed to the top tray of the stripper which has 30 trays. The stripper is designed to strip off practically all the ammonia and $CO_2$ from the solution leaving about 100 PPM of ammonium ion in the stripped solution. The overhead stream carries off all the ammonia, $CO_2$, 20% of water and some of the more volatile organic compounds in the feed. This stream is sent to a recovery unit (not shown) to recover the ammonia.

The top pressure of the stripper is maintained at 5 psig and the pressure in the bottom reaches about 8 psig. The overhead temperature reads about 85° C. At half way down the stripper the temperature on the tray will reach 112° C. Then the temperature on the lower trays will increase very slowly to 113° C. until the bottom tray. This indicates that most of the ammonia and $CO_2$ are stripped out of the solution when it reaches tray No. 15. The steam for stripping is provided by a reboiler at the bottom of the stripper.

However even though the stripper appears in stable operation the concentration of ammonium ion in the stripped solution varied from 100 to 1000 PPM. In addition, organic compounds were trapped in the middle of the stripper.

Caustic was added to tray No. 20 in the amount to make a 0.5% caustic concentration on the tray. The amount of caustic used was in excess of the stoichiometric amount required to liberate the $NH_3$ bound to the organic acids. The excess amount of caustic was intended to react with any ammonium carbonate that might still be present in the solution on the tray. The ten trays below the caustic injection tray will allow the liberated ammonia to be stripped off the solution. After the caustic addition the ammonium concentration in the stripped solution was reduced to 20-75 PPM.

The slow accumulation of a separate organic phase in the stripper disappeared after the caustic addition. The caustic evidently reacted with the weak organic acids which were dissociated from their ammonium salts by stripping to form soluble sodium salts.

Therefore the addition of the caustic has two beneficial effects.

The present invention is particularly advantageous in that it is possible to effectively strip ammonia and carbon dioxide from an aqueous ammonium carbonate solution, which includes organic ammonium salts and in particular ammonium salts of aromatic acids. By proceeding in accordance with the invention, it is possible to reduce the ammonia content of the stripped solution to consistent values, without the necessity of providing additional stripping equipment.

These and other advantages should be apparent to those skilled in the art from the teachings herein.

Numeous modifications and variations of the present invention are possible in light of the above teachings and, therefore, within the scope of the appended claims, the invention may be practised otherwise than as particularly described.

I claim:

1. In a process for stripping in a stripping column ammonia and carbon dioxide from an aqueous ammonium carbonate solution including organic ammonium salts, wherein said column has a plurality of trays and a top and a bottom, the improvement comprising:
    introducing inorganic base into the column at a point below the point of introduction of the aqueous ammonium carbonate solution and at a tray above the tray adjacent the column bottom to liberate ammonia from the organic ammonium salts and strip the liberated ammonia from the solution.

2. The process of claim 1 wherein the base is introduced into the column at a point where the ammonia content of the solution is less than 0.5%.

3. The process of claim 2 wherein the base is introduced into the column at a tray which is at least three trays above the bottom of the column.

4. The process of claim 3 wherein the organic ammonium salts comprise at least one ammonium salt of an aromatic acid.

5. The process of claim 1 wherein the base is sodium hydroxide.

6. The process of claim 1 wherein the aqueous ammonium carbonate solution is derived from the production of an aromatic nitrile and the organic ammonium salts comprise at least one ammonium salt of an aromatic acid.

7. The process of claim 6 wherein the base is introduced at a tray in the column where the ammonia content of the solution is less than 0.5% and which tray is at least three trays above the bottom of the column.

8. The process of claim 7 wherein the base is sodium hydroxide.

9. The process of claim 8 wherein the column is operated at an overhead temperature of from 70° to 100° C., a bottoms temperature of from 100° to 130° C. and a pressure of from 2 to 20 psig.

10. The process of claim 9 wherein the aqueous ammonium carbonate solution includes from 0.01 to 0.10% of ammonium salts of aromatic acids.

* * * * *